United States Patent [19]

Stoffel

[11] 4,144,547
[45] Mar. 13, 1979

[54] APPARATUS AND METHOD FOR ENCODING HALFTONE AND LINE COPY DATA

[75] Inventor: James C. Stoffel, Rochester, N.Y.

[73] Assignee: Xerox Corporation, Stamford, Conn.

[21] Appl. No.: 784,205

[22] Filed: Apr. 4, 1977

[51] Int. Cl.² .............................................. H04N 1/00
[52] U.S. Cl. ..................................... 358/260; 358/133
[58] Field of Search ................ 358/260, 261, 133, 138

[56] References Cited

U.S. PATENT DOCUMENTS

| | | | |
|---|---|---|---|
| 2,921,124 | 1/1960 | Graham | 358/138 |
| 4,005,411 | 1/1977 | Morrin | 358/261 |
| 4,070,694 | 1/1978 | Sakamoto et al. | 358/260 |

Primary Examiner—Richard Murray

[57] ABSTRACT

A system for encoding halftone and line copy data having an unknown screen frequency and/or angle is disclosed. The data, in binary pixel form, is inputted to multiple predictors, each adapted to handle different types of imagery. The predictions made are compared with the established values for the pixels predicted and error signals generated. The error signals so produced are compared and the error signal with the least error is chosen for encoding.

17 Claims, 4 Drawing Figures

APPARATUS AND METHOD FOR ENCODING HALFTONE AND LINE COPY DATA

This invention relates to a system for compressing or compacting halftone and line data, and more particularly, to a system for compressing data whose screen frequency and/or angle are unknown.

Pictorial information may be converted to binary data for various operating purposes as for example, to enhance transmittal of the pictorial information from one location to another, for storage purposes etc. If the data can also be compressed or compacted, certain highly desirable advantages accrue. For example, the amount of time required for transmittal of the data from one location to another can be greatly reduced. Additionally, existing data storage facilities can also be used more efficiently.

While therefore substantial benefits arise from data compaction, high data compaction ratios are of no avail if the pictorial information represented by the compressed data, is distorted or inaccurate. Optimumly, the highest compaction ratio without distortion of the original data is required. Additionally, in some situations, the screen frequency and/or angle of the data may be unknown rendering effective encoding and compression thereof difficult.

It is therefore a principal object of the present invention to provide a new and improved system for data compression.

It is an object of the present invention to provide an improved system for encoding halftone and line copy data.

It is an object of the present invention to provide method and apparatus for encoding data whose screen frequency and/or angle are unknown.

It is an object of the present invention to provide a relatively simple and improved predictive encoding system for encoding a pixel data of unknown screen frequency and/or angle with minimal error.

It is an object of the present invention to provide a new and improved process for encoding pixel data utilizing multiple predictors with selector means for selecting the output of the predictor having the least error for encoding.

It is an object of the present invention to provide an arrangement for encoding unknown pixel data in which the most accurate signal output of several potential encoders is chosen and address data identifying the encoder used supplied to facilitate later decoding.

The invention relates to a system for encoding image data, the combination of: multiple predictor means for predicting image values of the pixels, each of the predictor means generating an error signal representative of the accuracy of the prediction made, the predictor means including comparator means for comparing the predicted pixel image value with the established pixel image value to generate the error signal, each of the predictor means having a predetermined prediction function, and selector means for selecting from the multiple error signals the error signal having the least error for encoding.

The invention further relates to a method of encoding pixel image data, the steps including, thresholding the data to provide binary pixel image data; predicting in accordance with a predetermined predictive function the image value of the pixels from the established image value of other pixels comprising the data; comparing the predicted image values of the pixels with the established image value of the pixels; generating an error signal representative of the accuracy of the prediction; repeating the prediction at least once using different predictive functions; comparing the error signals so produced to determine the error signal having the least error; and encoding the error signal with the least error.

Other objects and advantages will be apparent from the ensuing description and drawings in which.

In the ensuing description, pixel refers to a picture element which may be defined as a scaler value of the gray scale of an image at a particular point of the image.

Where the data input comprises ½ tone and/or line copy, screen frequency and/or angle may be unknown. In this circumstance, an encoding arrangement must accommodate a large range of potential frequencies along the scan line as well as a relatively large amount of noise in the form of halftone dot shape variations.

Figure 1:
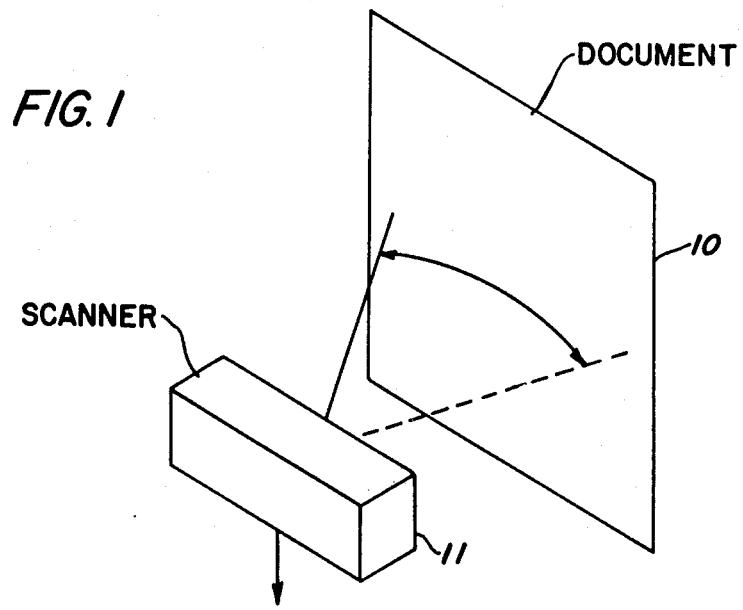
FIG. 1 is a schematic view of a source of pixel data.
Figure 2:
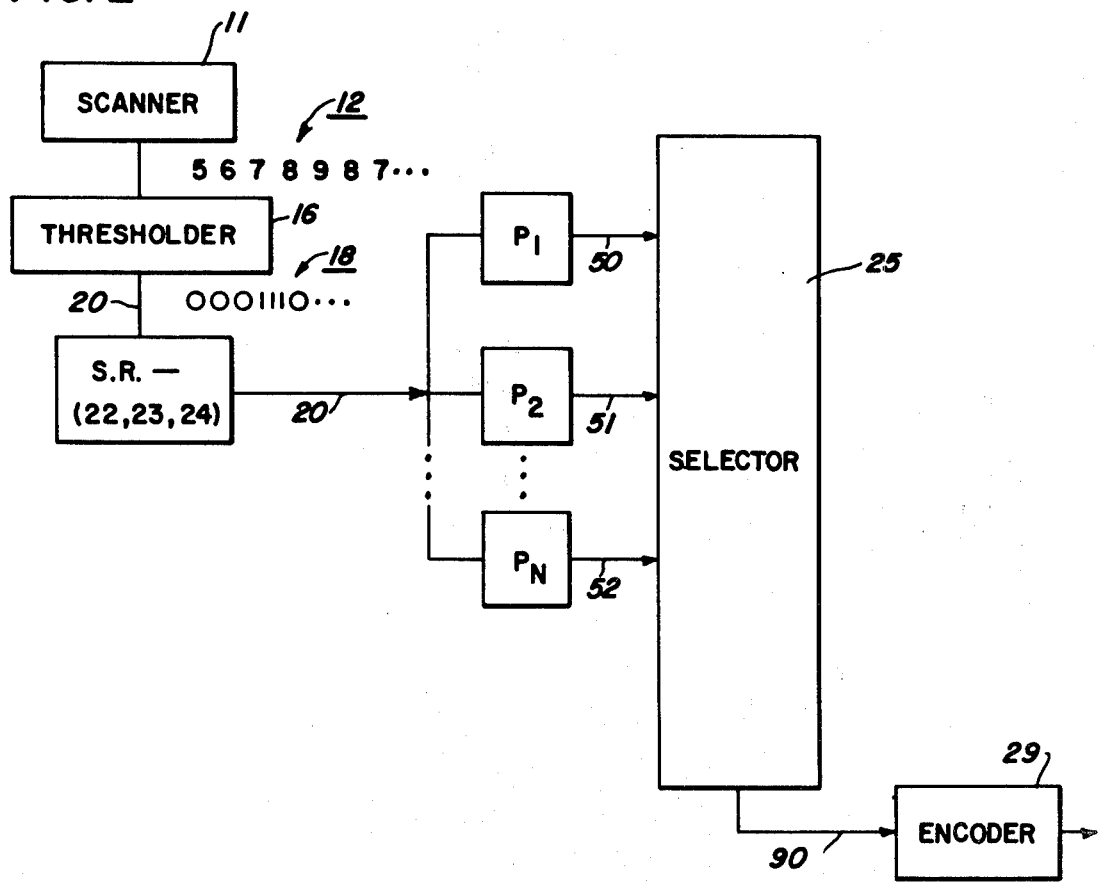
FIG. 2 is a block diagram of the multiple predictor/encoding apparatus of the present invention.

To accommodate data of the foregoing type, a multiple predictor arrangement is employed herein which operates on the data input a block at a time. Referring to FIGS. 1 and 2, a stream of pixel data 12 from a suitable source such as a line scanner 11 is there shown. As will be understood by those skilled in the art, the value of the pixels that comprise the stream of data 12 are a gray scale representation of an original image such as a document 10. For purposes of illustration, exemplary pixel values have been provided.

The stream of pixel data 12 is inputted via bus 15 to a suitable thresholder 16 which converts the pixel gray scale values of the data stream to binary "1" or "0". It will be understood that the binary pattern of data 18 produced is dependent upon the threshold setting of thresholder 16. In the example shown, the threshold setting of thresholder 16 is 7. This results in a stream of binary pixel data having the binary values illustrated in the drawing.

Other threshold logic may be envisioned.

The binary pixel data 18 which as alluded to may comprise both line copy and halftone data, is inputted via bus 20 and buffer shift registers 22, 23, 24 to multiple image predictors $P_1, P_2, \ldots P_n$. Image predictors $P_1, P_2, \ldots P_n$ each are programmed to accommodate different types of imagery. For example, image predictor $P_1$ may be set for predicting 65 cells/in. halftones, $P_2$ for 85 cells/in. halftones, $P_n$ for predicting line copy, etc. The predicted image values (IV) from predictors $P_1, P_2 \ldots P_n$ are compared with the established pixel image values (IV) and error signals (e) representing the amount of predictive error by each predictor $P_1, P_2 \ldots P_n$ are fed to selector 25. Selector 25 selects the prediction with the least number of errors. The error signal selected by selector 25 is fed to statistical encoder 29 where the error signal is suitably encoded.

Figure 3:
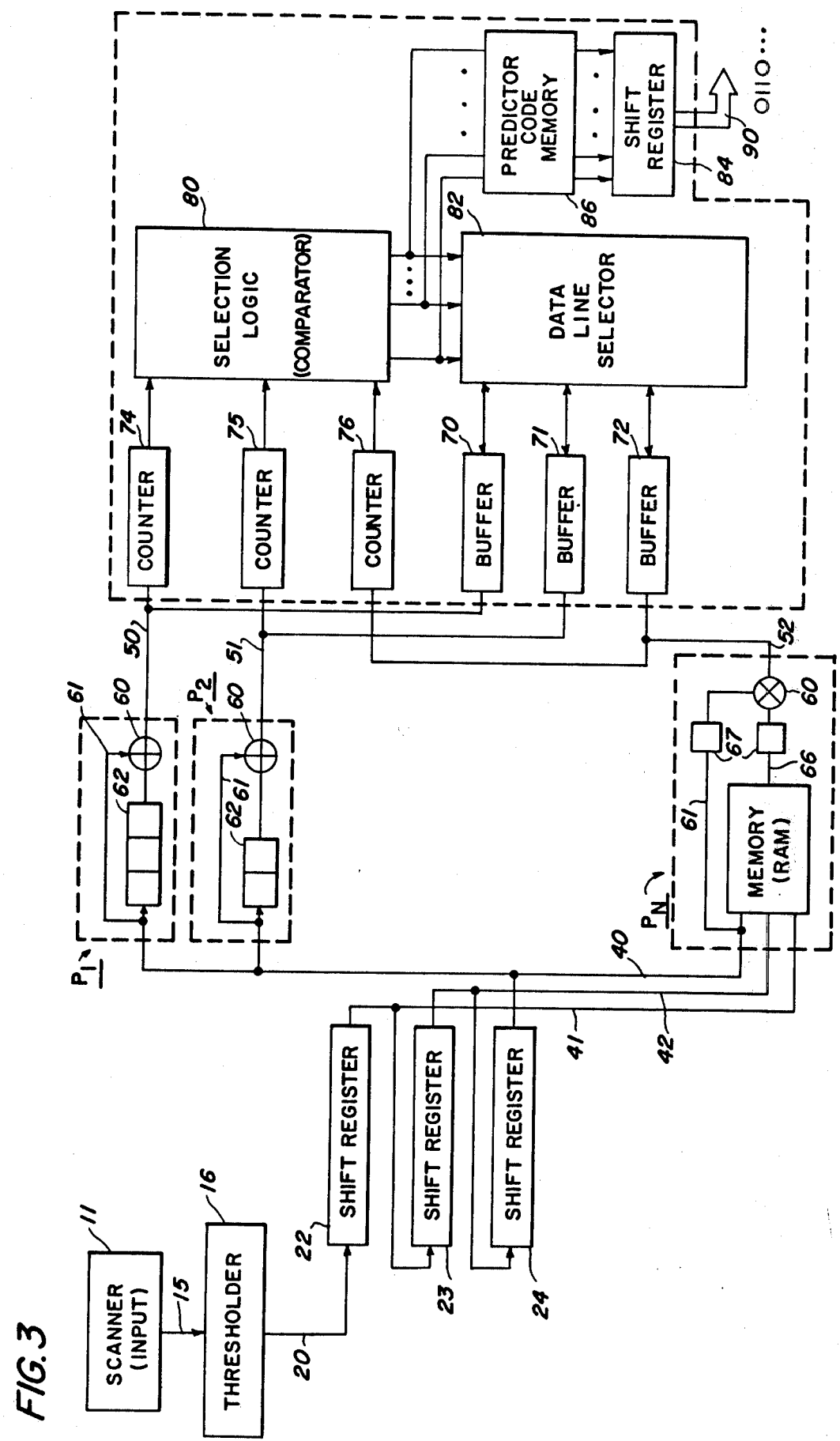
FIG. 3 is an expanded schematic view showing details of the multiple predictor/encoding apparatus shown in FIG. 2.

Referring particularly to FIG. 3, the binary pixel stream 18 of unknown screening function and/or angle from shift register 24 is inputted to image predictors $P_1, P_2 \ldots P_n$ via lead 40. Binary pixel data from multiple scan lines is inputted from shift registers 22, 23, 24 to multi-line predictor $P_n$ via leads 41, 42 and in the case of register 24, via lead 40.

Image predictors $P_1, P_2 \ldots P_n$ are each pre-programmed to accommodate a different type of imagery and serve to predict on a pixel-to-pixel basis the binary value of the various pixels. Predictors $P_1, P_2 \ldots P_n$ generate in output leads 50, 51, 52 thereof an error signal (e) reflecting the accuracy of the prediction. In the arrangement shown, each predictor $P_1, P_2 \ldots P_n$ incorporates an exclusive OR gate 60.

For single line predictors such as $P_1, P_2$, one binary pixel, i.e. the pixel to be predicted, is inputted to gate 60 directly via lead 61 while the other pixel, i.e. the pixel to be used for prediction, is fed through one or more register stages 62 to gate 60. Register stage or stages 62 serve to delay, by a predetermined count, the pixels passed therethrough so as to match the arrival of the selected comparator pixel with the pixel in lead 61. Exclusive OR gate 60 as will be understood, compares binary pixels inputted thereto and produces an output signal, i.e. error signal (e), reflecting the relative condition of the input pixels which is a measure of the accuracy of the prediction.

Multi-line predictors as exemplified by predictor $P_n$ utilize two dimensional context and compute a predicted binary pixel value. The predicted binary pixel is thereafter compared by means of exclusive Or gate 60 with the established value for the pixel to determine the error if any. Holding registers 67 correlate arrival of the reference pixel in output lead 66 with the predicted pixel in lead 61.

The block of error signals (e) generated by predictors $P_1, P_2 \ldots P_n$, representing the block of image data inputted to predictor $P_1, P_2 \ldots P_n$, are fed via leads 50, 51, 52 to buffers 70, 71, 72 and counters 74, 75, 76 respectively of selector 25. Buffers 70, 71, 72 store the block of error signals pending selection of the signal block with the least error by selection logic 80. Error signals inputted to counters 74, 75, 76 produce a count thereon reflecting for example the total number of binary 1's in the signal. Selection logic 80 compares the relative counts on counters 74, 75, 76 and identifies the counter having the least count thereon, i.e. the signal with the least error.

Data line selector 82 is provided, selector 82 controlling the release of data held in buffers 70, 71, 72 to output shift register 84 in response to the control signal input from selection logic 80. On a signal from logic 80, data line selector 82 triggers the buffer 70, 71 or 72 associated with the counter 74, 75 or 76 having the least count thereon and the block of data is released to output register 84.

Predictor code memory 86 contains address data identifying the various predictors $P_1, P_2 \ldots P_n$. The signal input from selection logic 80, representing the data signal with the least error, actuates memory 86 to provide address data to output register 84 identifying the predictor source $P_1, P_2 \ldots$ or $P_n$ for the data. The address data from memory 86 is combined with the block of data from the selected buffer 70, 71 or 72 in output register 84 for transmittal via bus 90 to encoder 29 (FIG. 2) where the signal is encoded by a suitable statistical encoder such as disclosed in U.S. Pat. No. 3,726,993 issued Apr. 10, 1973 to P. A. Lavallee, and incorporated by reference herein.

It will be understood that, with the specific predictive function known, the encoded error signal may be later decoded by reversing the aforedescribed encoding process to provide an exact duplicate of the binary image originally encoded (such as 18 in FIG. 2).

Figure 4:
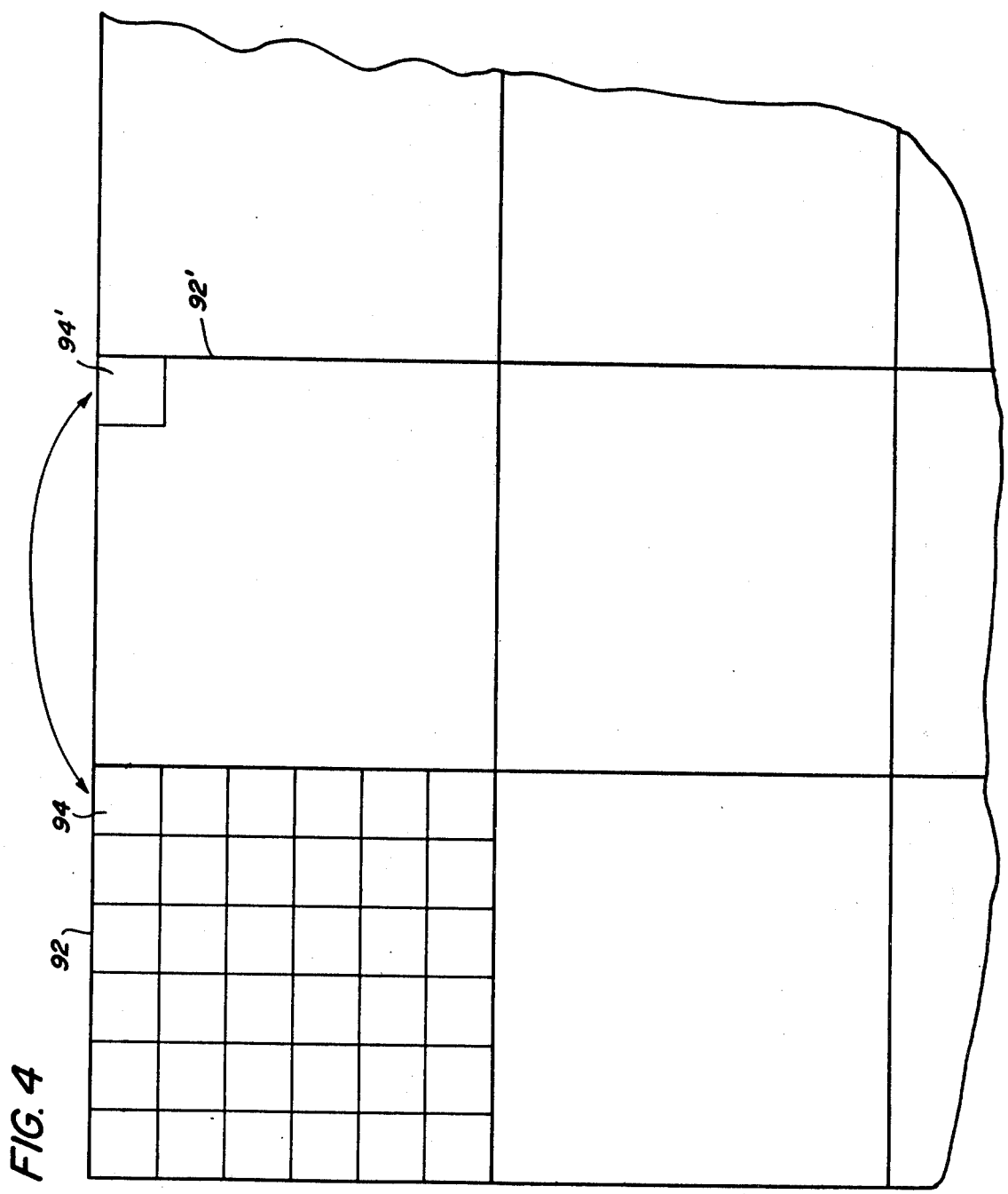
FIG. 4 is a schematic view showing pixel-to-pixel prediction on an inter-cell basis.

Referring to FIG. 4, one form of pixel-to-pixel type prediction, such as may be carried out by a single line predictor, i.e. $P_1$ or $P_2$ is thereshown. In FIG. 4, an error signal (e) is generated through prediction on a single binary pixel to single binary pixel basis using the pixels in one prescreened ½ tone cell 92 to predict the image value for the corresponding pixels in an adjoining cell 92'. In the example illustrated, the actual image value (IV) of pixel 94 in cell 92 is used as the basis for predicting the image value ($\overline{IV}$) of the corresponding pixel 94' in the adjoining cell 92' according to the following relationship:

$$\overline{IV}_{94'} = f(IV_{94})$$

where $IV$ is the established image value of the pixel 94 and
$\overline{IV}$ is the predicted image value of the pixel 94'.

The predicted image value ($\overline{IV}_{94'}$) is then compared with the established image value ($IV_{94'}$) and the error (e) determined in accordance with the following relationship:

$e = $ exclusive OR $(IV_{94}, \overline{IV}_{94'})$ where e is the error signal.

The error signal (e) is then compared with the error signal from the other predictors with the signal output from the most accurate predictor selected for encoding as described heretofore.

For example, if the established image value for pixel 94 is "1", the predicted image value ($\overline{IV}$) for pixel 94' of cell 92' would in that case be "1." If, however, the established image value (IV) for pixel 94' were "0," an error signal of "1" would be generated signifying that the predicted image value ($\overline{IV}$) was wrong. If as will be understood the predicted image value is correct, the error signal would be "0."

It is understood that different predictor/predicted pixel combinations may be chosen including single pixel-to-single pixel, multiple, pixel-to-single pixel, and single pixel-to-multiple pixel, and that predictions may be made on both inter cell and intra cell basis.

It will be understood that one and two dimensional predictors $P_1, P_2 \ldots P_n$ are applicable to either line or half tone copy, and may be used in combinations other than that illustrated herein.

While the invention has been described with reference to the structure disclosed, it is not confined to the details set forth, but is intended to cover such modifications or changes as may come within the scope of the following claims.

What is claimed is:

1. In a system for encoding pixel image data, the combination of:
   a. multiple predictor means for predicting image values of said pixels, each of said predictor means generating an error signal representative of the accuracy of the predictions made, said prediction means including comparator means for comparing the predicted pixel image value with the established pixel image value to generate said error signal,
      each of said prediction means having a predetermined prediction function, and b. selector means for selecting from said multiple error signals the error signal of one of said prediction means having the least error for encoding.

2. The system according to claim 1 including means for converting said pixel image data to binary image values.

3. The system according to claim 2 in which said predictor means includes at least one multiple line predictor.

4. The system according to claim 2 in which said predictor means includes at least one single line predictor.

5. The system according to claim 2 in which said converting means comprises threshold means having a predetermined threshold setting.

6. The system according to claim 1 including encoder means for encoding said selected error signal, and
  address means for generating address data identifying the prediction means for said selected error signal for incorporation with said encoded error signal.

7. In the method of encoding pixel image data, the steps including:
  a. thresholding said data to provide binary pixel image data;
  b. predicting in accordance with a predetermined predictive function the image value of said pixels from the established image values of other pixels comprising said data;
  c. comparing the predicted image values of said pixels with the established image values of said pixels;
  d. generating an error signal representative of the accuracy of said prediction;
  e. repeating steps b, c and d using predictive functions other than said predetermined predictive function;
  f. comparing the error signals so produced to determine the error signal having the least error; and
  g. encoding the error signal with the least error.

8. The method according to claim 7 including the step of separating said pixel image data into lines.

9. The method according to claim 8 including the step of making said predictions on a single line basis.

10. The method according to claim 8 including the step of making said predictions on a multiple line basis.

11. The method according to claim 8 including the step of making at least one of said predictions on a multiple line basis.

12. The method according to claim 7 including the step of encoding address data with said error signal identifying the predictive function used to provide said error signal.

13. The method according to claim 12 including the step of decoding the error signal encoded to produce said image.

14. The method according to claim 12, the step of using said address data to identify the predictive function by which said encoded error signal was generated, and decoding said encoded error signal to provide said image.

15. In a system for compressing a stream of pixel image data, the combination of:
  at least two predictor/comparator means for predicting image values of the pixels within said data stream from the established image value of other pixels within said data stream and comparing the predicted pixel image value with the pixel established image value to produce an error signal; and
  means for encoding the error signal having the least error.

16. The system according to claim 15 including comparator means for comparing the error signals from said predictor/comparator means to determine the error signal with the least error; and
  means for temporarily storing the error signals from said predictor/comparator means pending determination of the signal with the least error.

17. The system according to claim 15 including line copy predictor/comparator means for predicting image values of pixels in said data stream from the established image value of other pixels in said line and comparing the predicted pixel image value with the pixel established image value to produce one of said error signals.

* * * * *